United States Patent [19]
Milton et al.

[11] Patent Number: 5,903,654
[45] Date of Patent: May 11, 1999

[54] METHOD AND APPARATUS FOR ELIMINATING IONOSPHERIC DELAY ERROR IN GLOBAL POSITIONING SYSTEM SIGNALS

[75] Inventors: Kevin Milton, Swisher; Ron Meyer, Cedar Rapids, both of Iowa

[73] Assignee: Rockwell Science Center, Inc., Thousand Oaks, Calif.

[21] Appl. No.: 08/907,294

[22] Filed: Aug. 6, 1997

[51] Int. Cl.⁶ .............................. H04B 7/185; G01S 5/02; H04L 9/00
[52] U.S. Cl. .................................... 380/49; 380/2; 380/9; 380/59; 342/352; 342/357; 701/213; 701/214
[58] Field of Search .................................. 342/357, 457, 342/352, 460; 380/2, 9, 49, 59; 701/207, 213, 214, 215, 216

[56] References Cited

U.S. PATENT DOCUMENTS

| | | | |
|---|---|---|---|
| 4,463,357 | 7/1984 | MacDoran | 342/460 |
| 4,809,005 | 2/1989 | Counselman, III | 342/352 |
| 4,894,662 | 1/1990 | Counselman | 342/357 |
| 5,148,179 | 9/1992 | Allison | 342/357 |
| 5,323,322 | 6/1994 | Mueller et al. | 342/357 X |
| 5,663,735 | 9/1997 | Eshenbach | 342/357 |
| 5,781,152 | 7/1998 | Renard et al. | 342/357 |
| 5,812,961 | 9/1998 | Enge et al. | 342/357 X |
| 5,828,336 | 10/1998 | Yunck et al. | 342/357 |

*Primary Examiner*—Bernarr E. Gregory
*Attorney, Agent, or Firm*—Kyle Eppele; James P. O'Shaughnessy

[57] ABSTRACT

A method and apparatus for determining and removing the error in the SPS measurement of the Global Positioning System due to ionospheric delay. The disclosed technique utilizes semi-codeless technique to provide high accuracy GPS measurements. The delay of the P code is varied and the signals are cross correlated until a maximum value is reached. When the cross correlation of the L1 and L2 signals is at a peak value, the relative delay between the L1 and L2 signals is proportional to the ionospheric delay. The derived ionospheric delay may be accounted for in measurement analysis of the L1 signal to provide for a high precision position solution. The semi-codeless correlator also provides the L1–L2 carrier phase measurement for wide-lane applications.

9 Claims, 3 Drawing Sheets

5,903,654

METHOD AND APPARATUS FOR ELIMINATING IONOSPHERIC DELAY ERROR IN GLOBAL POSITIONING SYSTEM SIGNALS

TECHNICAL FIELD

The present invention generally relates to the field of global positioning systems, and more particularly to a method and apparatus for determining and eliminating ionospheric delay of GPS signals and more particularly to such a method and apparatus wherein said determination and elimination may occur without knowledge of the encrypted GPS signal.

BACKGROUND OF THE INVENTION

The Global Positioning System is a space-based radio navigation system operated by the US Air Force for the United States Government. GPS was originally developed as a military force enhancement system and continues to play this role. However, GPS has also demonstrated a significant potential to benefit the civilian community in an increasingly large variety of applications. In an effort to make the service available to the greatest number of users without adversely effecting national security interests two GPS services are provided. The Precise Positioning Service (PPS) is available primarily to the military of the United States and its allies for users properly equipped with PPS receivers. The Standard Positioning Service (SPS) is designed to provide a less accurate positioning capability than PPS for civil and all other users throughout the world.

In high precision GPS applications, it is desirable to be able to account for delay of the GPS signals caused by the ionosphere. For example, in an avionics environment utilizing GPS signals to determine the relative positions and velocities of aircraft, reduction of the error in the GPS signal increases the accuracy of the aircraft tracking data, thereby providing increased safety and reduced likelihood of collision. Thus, elimination of error in the GPS signal caused by the ionosphere to improve the accuracy of the GPS signal is highly desirable.

For each satellite in the global positioning system (GPS), the total signal comprises two transmission signals, the L1 signal having a carrier frequency of 1.57542 GHz, and the L2 signal having a carrier frequency of 1.2276 GHz. Both the L1 and the L2 signals are biphase modulated by several digital signals. The high precision code (P) is one modulating signal which has a code rate of 10.23 MHz. Another signal is an optional encoding encrypting code (E) which is utilized by the Department of Defense (DOD) to encrypt and deny unauthorized access to the L2 GPS signal. The E code has been reported to have a bandwidth of approximately 500 kHz in the open literature.

The United States Government defines the GPS Standard Positioning Service (SPS) as a position and timing service provided on the GPS L1 frequency. The GPS L1 frequency, transmitted by all GPS satellites, contains a coarse acquisition (C/A) code and a navigation data message. The GPS L1 frequency also contains a precision (P) code that is reserved for military use and is not part of the SPS. The P code can be altered without notice and will not normally be available to users who do not have valid crypto keys. GPS satellites also transmit a second ranging signal known as L2. This signal is not part of the SPS, although many civil receivers have incorporated technologies into their design that enables them to use L2 to support two-frequency corrections. SPS performance standards are not predicated upon use of L2.

The GPS Block II/IIA satellite constellation nominally comprises 24 operational satellites. Each satellite generates a navigation message based upon data periodically uploaded from a control segment which it then adds to a 1.023 MHz Pseudo Random Noise (PRN) Coarse/Acquisition (C/A) code sequence. The satellite modulates the resulting code sequence onto a 1575.42 MHz L-band carrier to create a spread spectrum ranging signal which it then broadcasts to the user community. This broadcast is referred to as the SPS ranging signal. Each C/A code is unique and provides the mechanism to identify each satellite in the constellation. The GPS satellite also transmits a second ranging signal known as L2 that supports PPS user two-frequency corrections. L2, like L1, is a spread spectrum signal and is transmitted at 1227.6 MHz.

The SPS signal, or SPS ranging signal, is an electromagnetic signal originating from an operational satellite. The SPS ranging signal consists of a Pseudo Random Noise (PRN) Coarse/Acquisition (C/A) code, a timing reference and sufficient data to support the position solution generation process.

The SPS ranging signal measurement is the difference between the ranging signal time of reception (as defined by the receiver's clock) and the time of transmission contained within the satellite's navigation data (as defined by the satellite's clock) multiplied by the speed of light. The SPS ranging signal measurement is also known as the pseudo range. The estimated geometric range is the difference between the estimated locations of a GPS satellite and an SPS receiver.

Navigation data is data provided to the SPS receiver via each satellite's ranging signal, containing the ranging signal time of transmission, the transmitting satellite's orbital elements, an almanac containing the abbreviated orbital element information to support satellite selection, ranging measurement correction information, and status flags. The position solution is the use of ranging signal measurements and navigation data from at least four satellites to solve for three position coordinates and a time offset.

Dilution of Precision (DOP) describes the magnifying effects on GPS position error induced by mapping GPS ranging errors into positions through the Position Solution. The DOP may be represented in any user local coordinate desired. Examples are HDOP for local horizontal, VDOP for local vertical, PDOP for all three coordinates, and TDOP for time. The Position Solution is the use of ranging signal measurements and navigation data from at least four satellites to solve for three position coordinates and a time offset.

The GPS signal consists of two synchronous transmissions on carrier frequencies of 1.57542 GHz and 1.2276 GHz, known as Link 1 (L1) and Link 2 (L2), respectively. Both the L1 and the L2 signals are biphase modulated by digital symbols with amplitudes of ±1. The digital signal sequences consist of a 10.23 Mbps high precision ranging code (P code - unclassified), a 1.023 Mbps clear/acquisition ranging code (C/A code), a 50 bps navigation information signal, and a classified encryption code (E code) overlaid on the P code. The E code forms a signal known as the Y code (Y=P⊕E). The Y code provides GPS with anti-spoofing (A/S) capability and can be enabled or disabled by the GPS master control. Only authorized receivers have access to the Y code. Current operational policy by the DOD is to keep the Y code active at all times.

The L1 signal contains in-phase and quadrature components. The in-phase modulation is E⊕P⊕D and the quadrature modulation is generated by C/A⊕D. The signal broadcast from the satellite is represented as:

$$S_{L1_i}(t) = \sqrt{2P_{L1_i}}\ e_i(t)p_i(t)d_i(t)\cos[\omega_{L1}t + \phi_{L1}] + 2\sqrt{P_{L1_i}}\ c_i(t)d_i(t)\sin[\omega_{L1}t + \phi_{L1}]$$

where i denotes the $i^{th}$ satellite in the GPS constellation and P is the signal power.

The L1 1.023 Mbps C/A code repeats every 1 ms and provides a single frequency, low accuracy navigation signal for the Standard Position Service (SPS). Commercial users have access to the C/A and P codes. The C/A code is used by receivers to derive a hand-over word acquisition of the P code. Each P code has a repetition period of one week.

The L2 signal is modulated by either the P (or Y) code or C/A as directed by the GPS master control segment. Normal operation is selected to be P code modulation with the A/S feature enabled on L1 and L2 (Y code). The low rate navigation data may or may not be transmitted on L2 as selected by ground command. If the data message is transmitted and A/S is enabled, the L2 signal transmitted by the $i^{th}$ satellite is represented as:

$$S_{L2_i}(t) = \sqrt{P_{L1_i}}\ e_i(t)p_i(t)d_i(t)\cos[\omega_{L2}t + \phi_{L2}]$$

The low data rate navigation signal consists of orbital parameters and clock correction information plus other information. The DOD has implemented a feature known as selective availability (S/A) that degrades the accuracy of the navigation solution for unauthorized receivers. Authorized receivers can completely remove the effects of S/A.

The unauthorized user will not have access to the encrypted P code and cannot access the algorithm to remove the S/A degradation. The effects of S/A can be mitigated by differential GPS (DGPS) measurements and broadcast of the pseudo-range differential corrections provided the update rate is sufficiently high.

A class of algorithms known as codeless techniques can be used to measure the ionospheric delay. These algorithms are known as codeless because they do not require the knowledge or generation of the encrypted ranging codes. The codeless measurement is made by performing a cross correlation of the L1 and L2 signals. A correlation peak is detected when the ionospheric delay is equal to the delay of the L1 signal path. This technique works only because the modulation and encryption codes on both frequencies are identical and synchronous.

However, the primary disadvantage of this technique is the large SNR penalty incurred when the cross correlation must be done in the full bandwidth of the P code. The GPS signals are received well below the thermal noise. Correlating the L1 and L2 signals in the full P code bandwidth requires integration times on the order of several minutes to achieve acceptable pre-detection signal to noise ratios under weak signal conditions.

Additional disadvantage may be encountered in the use of codeless algorithms. Although ionospheric dynamics typically have time constants on the order of tens of minutes, measurements of the ionospheric delays of satellites with low elevation angles may be difficult or impossible to achieve with a high degree of accuracy. This is due to two reasons. First, the satellite signal power is very low when viewed at the horizon. Second, the signals typically experience higher dynamics at low elevation angles due to satellite and receiver geometry changes and longer ionospheric propagation path lengths. The longer integration times required under these conditions may distort dynamic information in the signal that users require for accurate and continuous correction for ionospheric delays.

It is known that the L1 and L2 signals are synchronous with respect to each other, including corresponding E codes. Since the signals are synchronous, the signals may be cross correlated with one another by utilization of a semi-codeless technique, controlling the relative delay of the signals with respect to each other and measuring the resulting correlation value. This cross correlation is performed in the reduced bandwidth of the E code. The relative delay is proportional to the ionospheric delay when the cross correlation has reached a maximum value.

SUMMARY OF THE INVENTION

The present invention utilizes a semi-codeless technique to obtain ionospheric delay measurements by utilization of some knowledge of the E (or Y) code. An algorithm that makes use of some knowledge of the Y code characteristics is known as a semi-codeless technique. All of the knowledge of the E code utilized in the present invention is available in the open literature. Industry measurements of live GPS signals have reported in the open literature that the E code has a bandwidth of approximately 500 kHz. The present invention utilizes a method to acquire and track P code for L1 and L2 to effectively cross correlate the two frequencies in a 500 kHz bandwidth. The reduced bandwidth cross correlation technique of the present invention provides an improvement in the correlation SNR on the order of 13 dB.

Accordingly, it is a goal of this invention to provide a method and apparatus for improving the accuracy of the commercial GPS signal.

It is a further goal of the present invention to be able to measure the ionospheric delay of the GPS signal without knowledge of the E (or Y) code sequence.

Another goal of the present invention is to reduce the noise in the L1/L2 delay measurement by increasing the signal to noise ratio.

These and other goals may be achieved by accounting for the error caused by ionospheric delay of the GPS signal.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
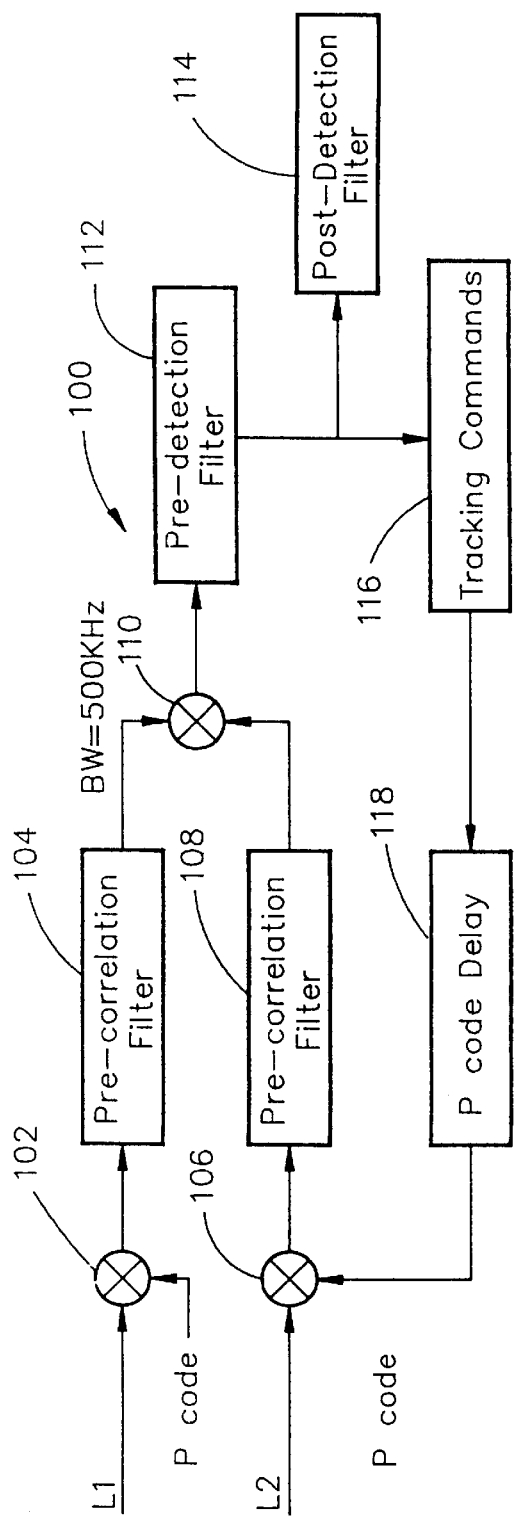
FIG. 1 is a schematic diagram of an implementation of the present invention.

Referring now to FIG. 1, a schematic diagram of an implementation 100 of the invention is shown. The L1 signal ("L1") is received from a GPS satellite and mixed with the P code ("P code") with a first mixer 102. The output of the mixer is fed into a pre-correlation filter ("Pre-correlation Filter") 104 having a bandwidth of 500 kHz. The bandwidth of the precorrelation filter 104 is selected based upon a determination by industry measurements that the E code has a bandwidth of approximately 500 kHz.

Similarly, the L2 code ("L2") is received from the GPS satellite and is fed into a second mixer 106 the output of which feeds into a second pre-correlation filter 108. The outputs of both pre-correlation filters (106, 108) are fed into a third mixer 110 which performs the cross correlation of the L1 and L2 signals, the output of which is fed into a pre-detection filter ("Pre-detection Filter") 112. The output of the pre-detection filter 112 is fed into a post detection filter ("Post-detection Filter") 114. The output of the pre-detection filter is also fed into a tracking command circuit ("Tracking Commands") 116, the output of which is fed into a P code delay circuit ("P code Delay") 118. The output of the P code delay circuit is mixed with the L2 signal at the second mixer 106.

The stripping of the P code from the L1 and L2 signals allows the signals to be filtered in a much narrower bandwidth. This increases the signal to noise ratio at the correlation mixer, thus improving the signal to noise ratio of the entire process. The bandwidth is determined by the encrypting code. Not removing the P code from the signals results in a serious signal to noise penalty.

No estimation of the encrypting code sequence is necessary with the present invention. Since the encrypting codes are identical, the cross correlation process substantially eliminates the effect of the encrypting codes on the delay measurement.

Since the L1 and L2 signals are synchronous, they can be cross correlated with one another. The relative delay between the local L1 and L2 P code signals may be varied and the resulting cross correlation value is measured until a maximum value is reached. When the cross correlation value is at its maximum value, the amount of relative delay present between the P codes is proportional to the ionospheric delay. Thus, the determined ionospheric delay may be subtracted from the SPS solution to improve the accuracy of the resulting GPS measurements.

For the implementation of the present invention illustrated in FIG. 1, it is assumed that the P code has been acquired by tracking the L1 and C/A code. The L1 C/A code position is also used to initialize the L2 P code position. The P code for both channels is despread with a locally generated version of the code. The output of the P code correlator for each channel is processed with an integrate and dump filter. This type of integrator is referred to as a pre-correlation filter (PCF). The integrate and dump filter provides an output with reduced bandwidth for the cross correlation operation. The output of the PCF at the end of the $k^{th}$ integrate and dump cycle for each channel is proportional to:

L1 PCF output: $R_p(\tau)E(k)$

L2 PCF output: $R_p(\tau_{iono} - \tau')E(k)$ where $R_p(\tau)$ is the auto-correlation function of the P code, $\tau$ is the L1 code misalignment, $\tau_{iono}$ is the true ionospheric delay difference, $\tau'$ is the receiver's estimate of the delay difference, and E(k) is the E code encryption symbol at the $k^{th}$ integrate and dump cycle. If the receiver is perfectly tracking the L1 and L2 P codes, $\tau$ and $\tau_{iono} - \tau'$ are equal to zero. After cross correlation of the PCF signals, the output of the integrator (predetection filter) will be proportional to:

$R_p(\tau_{iono} - \tau')R_E(\tau_{iono})$

When the correlation output reaches a peak, $\tau'$ will be an estimate of the differential ionospheric delay between the L1 and L2 channels. This measurement is made by comparison of the P code positions for each of the channels. As can be seen from the above expression, an additional loss factor at the correlator output occurs to the misalignment of the E codes. For typical ionospheric differential delays (60 to 100 ns), an approximate penalty of 0.2 dB is expected due to the E code cross correlation.

Figure 2:
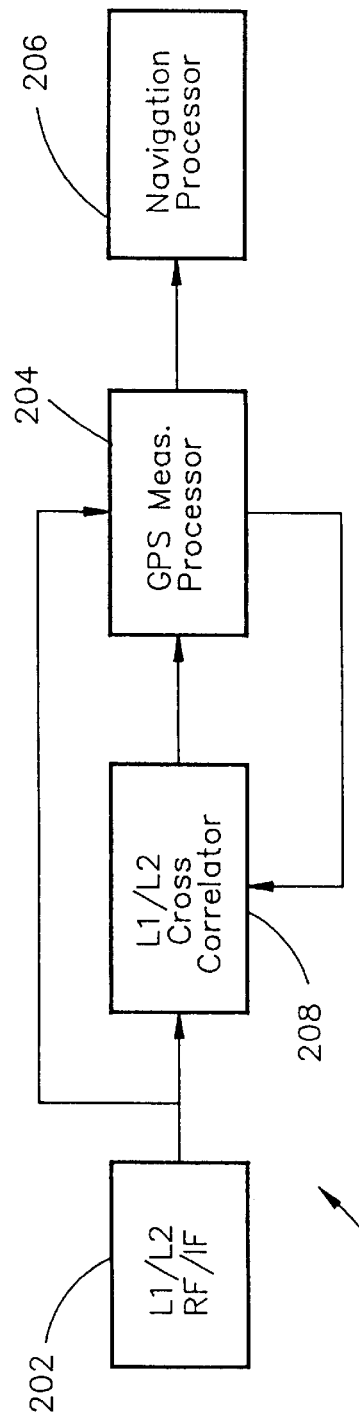
FIG. 2 is a schematic diagram of the overall GPS signal processing scheme of the present invention.

Referring now to FIG. 2, a schematic diagram of the overall GPS signal processing scheme 200 of the present invention is shown. L and L2 signal intermediate frequency (IF) information is fed from RF/IF processing circuits ("L1/L2 RF/IF") 202 into a GPS measurement processor ("GPS Meas. Processor") 204 for determination of position, velocity and time information. The position and time information calculated by the GPS measurement processor 204 and the RF/IF processor 202 may then be fed into a navigation processor ("Navigation Processor") 206 such as found in the navigation circuitry of, for example, user aircraft. The outputs of the GPS measurement processor 204 and the RF/IF processor 202 are further fed into a Semi-Codeless L1/L2 cross correlator ("Semi-Codeless L1/L2 Cross Correlator") 208 for performing cross correlation processing of the L1 and L2 IF information. The output of the semi-codeless cross correlator 208 is then fed back into the GPS measurement processor 204 for correction of the measurement data.

Figure 3:
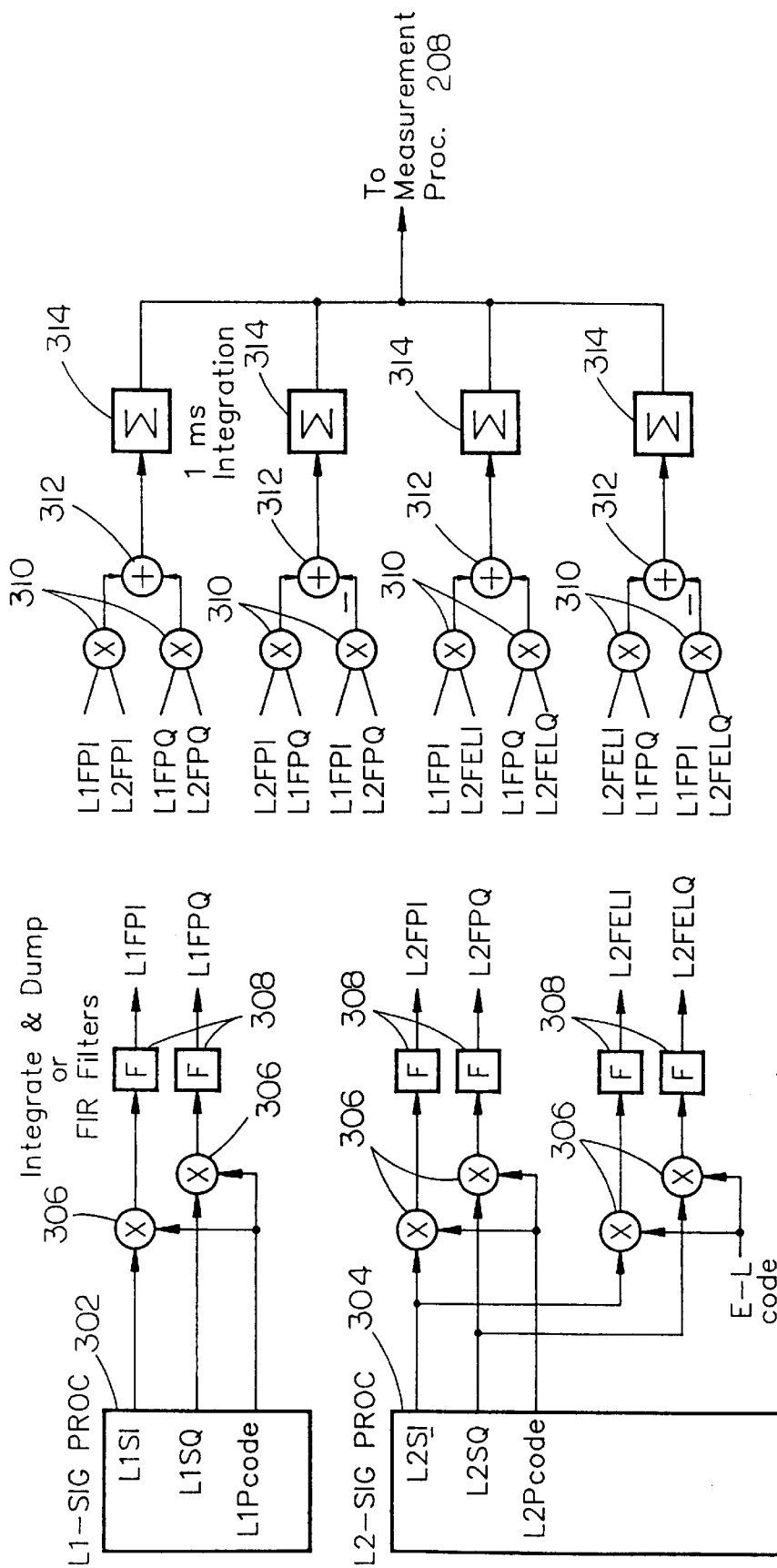
FIG. 3 is a detailed diagram of the semi-codeless L1/L2 cross correlator of FIG. 3.

Referring now to FIG. 3, a detailed diagram of the semi-codeless L1/L2 cross correlator 208 of FIG. 2 is shown and depicted as reference numeral 300. An L1 signal processor 302 provides L1SI, L1SQ and L1 P code outputs. The L1SI and the L1SQ signals are each mixed with multipliers 306 with the L1 P code signal, respectively, and then fed into filters 308 which may be integrate and dump or FIR filters to provide L1FPI and L1FPQ outputs. Likewise, an L2 signal processor 304 provides L2 SI, L2 SQ and L2 P code outputs. The L2SI and the L2SQ signals are each mixed with the L2 P code signal, respectively, and then fed into filters 308 (for example, integrate and dump or FIR filters) to provide L2FPI and L2FPQ outputs. The L2SI and the L2SQ signals are additionally multiplied with the E-L code and filtered to provide L2FELI and L2FELQ outputs.

The L1FPI signal is mixed using a multiplier unit 310 with the L2FPI signal and summed using a summing unit 312 with the L1FPQ signal mixed with the L2FPQ signal. The L2FPI signal is mixed with the L1FPQ signal and summed with the L1FPI signal mixed with the L2FPQ signal. The L1FPI signal is mixed with the L2FELI signal and summed with the L1FPQ signal mixed with the L2FELQ signal. The L2FELI signal is mixed with the L1FPQ signal and summed with the L1FPI signal mixed with the L2FELQ signal. Each of the summed signals is fed into an integrator 314 for performing 1 ms integration. The outputs of the integrators are combined and fed back to the GPS measurement processor 208.

Figure 4:
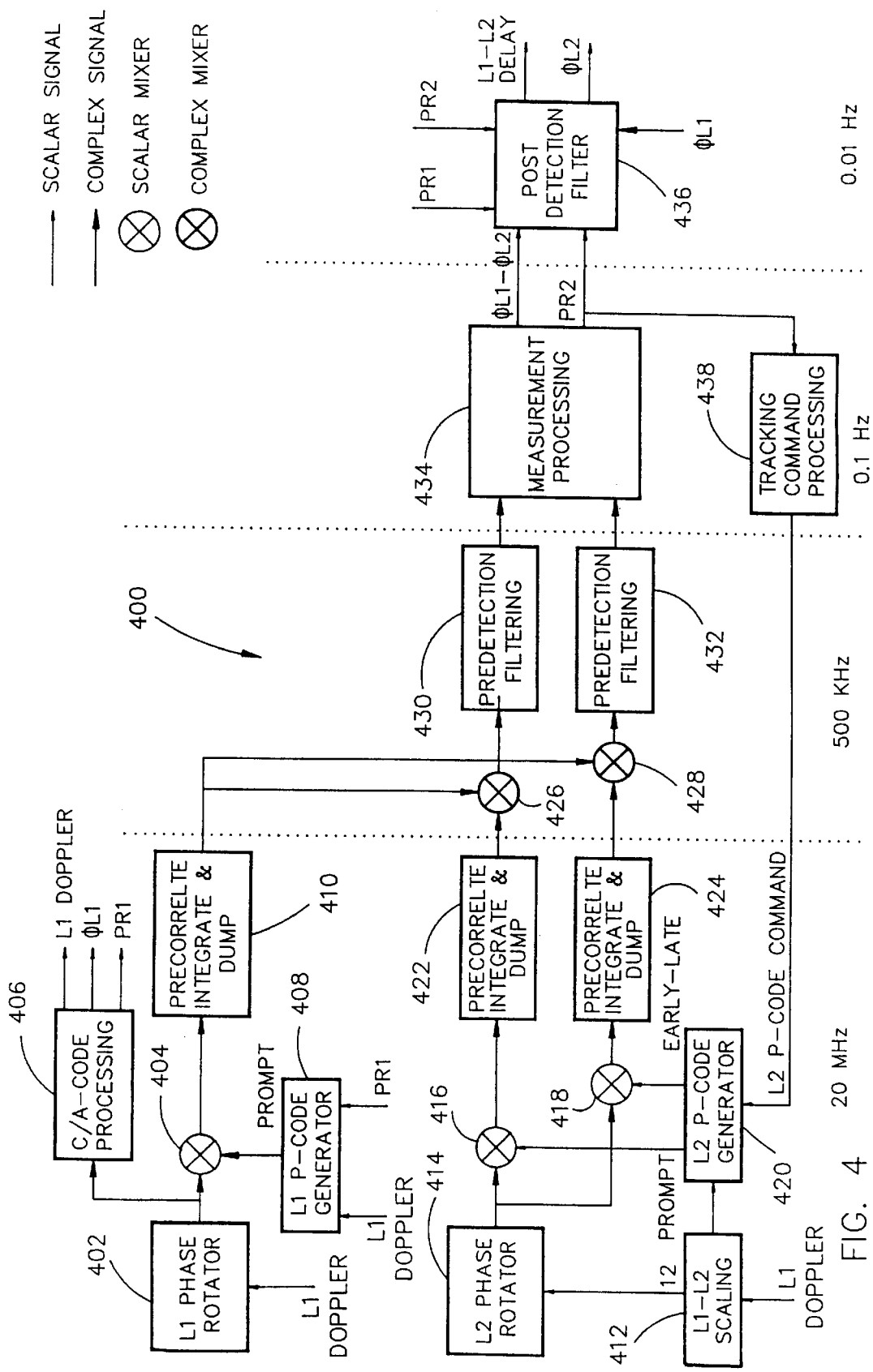
FIG. 4 is a detailed schematic diagram of GPS processor of the present invention.

Referring now to FIG. 4, a detailed schematic diagram of GPS processor of the present invention is shown and referred to as reference numeral 400. The L1 phase rotator ("L1 PHASE ROTATOR") 402 receives the L1 signal and provides an output to a multiplier unit 404. The output of the L1 phase rotator 402 is also fed into a C/A-code processor ("C/A CODE PROCESSING") 406, the outputs of which are fed into an L1 P-code generator ("L1 P-CODE GENERATOR") 408. The output of the L1 P-code generator 408 is fed into mixer unit 404 to be multiplied with the L1 signal. The output of multiplier 404 is fed into the input of a pre-correlation integrate and dump filter ("PRECORRELATE INTEGRATE & DUMP") 410.

The L2 signal is fed into a scaling unit ("L1–L2 SCALING") 412 for performing scaling of the L2 doppler signal with respect to the L1 doppler signal. The output of the scaling unit 412 feeds into an L2 phase rotator ("L2 PHASE ROTATOR") 414 having a split output each being fed into multiplier units (416, 418). An output of the L1–L2 scaling unit 412 further feeds into an L2 P-code generator ("L2 P-CODE GENERATOR") 420 having outputs which are mixed with the outputs of the L2 phase rotator 414. The output of mixers (416, 418) are fed into pre-correlate integrate and dump filters ("PRECORRELATE INTEGRATE & DUMP") (422, 424) whose outputs are each mixed with the output of the L1 pre-correlation filter 410 with multipliers (426, 428). The resulting mixed outputs are each fed into pre-detection filtering units ("PREDETECTION FILTERING") (430, 432) each having an output fed into a measurement processing unit ("MEASUREMENT PROCESSING") 434. The outputs of the measurement processing unit 434 are fed into a post detection filter ("POST DETECTION FILTER") 436. One output of the measurement processing unit 434 feeds into a tracking command processing unit ("TRACK COMMAND PROCESSING") 438 providing an output which feeds into the L2 P-code generator 420. The output of the post detection filter 436 provides a signal equal to the delay between the L1 and L2 signals. When the cross correlation of the L1 and L2 signals is maximized, the relative delay between the L1 and L2 signals is proportional to the ionospheric delay.

For L1/L2 cross correlation, the mathematical representation of the L1 and L2 signals may be given as follows:

$$L1(t)=e(t)p(t)\cos(\omega_1 t)+c(t)d(t)\sin(\omega_1 t)$$

$$L2(t)=e(t-d)p(t-d)d(t-d)\cos(\omega_2(t-d))$$

When the L1 and L2 signals are translated together to a common intermediate frequency and multiplied together the resulting signal may be given as follows:

$$L1(t)L2(t)=e(t)p(t)d(t)e(t-d)p(t-d)d(t-d)$$

The combined signal represents the cross-correlation between the L1 and L2 signals. The delay terms, d, are adjusted to maximize the cross correlation signal to a peak value. When the cross correlation signal is at a peak value, the value d represents the desired value of the ionospheric delay. In order to provide a more accurate position solution, the effect of the ionosphere delay (d) may be accounted for in the GPS measurement processing.

For the semi-codeless cross correlation technique for L1/L2 wherein knowledge of Y code sequence is not known, but signal structure comprising Y-code is assumed, correlation may be performed within a reduced bandwidth thereby reducing effects of noise and allowing reception of signals having lower signal-to-noise ratios. The bandwidth of the E (or Y code) has been measured from operational satellites and has been discussed in the open literature. The measurement proves a lower rate encrypting code is modulated onto current P code. Delay of L1 signal that is required in the codeless technique is unnecessary because correlation delay may be obtained with P code shifting. Any error due to data and encrypting code shifting is insignificant in the ionospheric delay measurement.

The semi-codeless ionospheric delay measurements of the present invention may be implemented by utilizing L1 and L2 P code tracking. Experience has shown that the $L_1$ code clocks for the C/A and P codes from the satellite are in near perfect synchronization. This means that the C/A tracking loops can be used to track the $L_1$ P code in an "open loop" fashion.

The 50 bps navigation message contains a hand over word that the receiver can process after C/A acquisition. This hand-over word is used to determine the P code alignment. After the $L_1$ C/A code is acquired and is being tracked, then P code can be tracked using steering commands from the C/A code and carrier loops. This tracking technique is referred to as C/A-to-P code aiding. The P code VCO is fed steering commands from the C/A carrier and code tracking loops. This allows the $L_1$ code VCO to track P code Doppler. Updates to the $L_1$ VCO are made every 20milliseconds.

Acquisition and tracking of the P code on the $L_2$ frequency requires a cross correlation of the $L_1$ and $L_2$ P codes. The $L_2$ channel may preferably contain a first-order delay lock loop that is driven by the $L_1 \times L_2$ cross correlation product in the reduced bandwidth of the E code. The basic idea is that the cross correlation product can be used to steer the receiver's $L_2$ P code generator into alignment with the received signal. The cross correlation product will reach a peak when the $L_2$ P code generator is tracking the received signal. After the loops have converged, the ionospheric delay is measured by the difference of the P code generator positions of the $L_1$ and $L_2$ channels.

The delay lock loop (DLL) $L_2$ P code generator produces prompt, early, and late signals. The early and late signals are one-half P chip phase advanced and retarded versions of the prompt signal, respectively. The early and late signal are subtracted to form one injection signal known as early minus late (E minus L).

After the P code has been despread and filtered by the precorrelation filter, the $L_1$ and $L_2$ I and Q components are cross multiplied and filtered with an integrate and dump for one second. The one second I & D is the pre-detection filter. The pre-detection filter integrate and dump period may be programmed by the user for longer or shorter periods as a function of the received signal conditions. The outputs of the prompt and E minus L pre-detection filters are:

Prompt outputs $$IP=A_1 A_2 R(\lambda_2-\tau_2)R(\lambda_2-\tau_2)R_E(\lambda_1-\lambda_2)[\cos(\theta_1-\theta_2)]$$

$$QP=A_1 A_2 R(\lambda_1-\tau_1)R(\lambda_2-\tau_2)R_E(\lambda_1-\lambda_2)[\sin(\theta_1-\theta_2)]$$

E-L outputs $$ID=A_1 A_2 R(\lambda_1-\tau_1)D(\lambda_2-\tau_2)R_E(\lambda_1-\lambda_2)[\cos(\theta_1-\theta_2)]$$

$$QD=A_1 A_2 R(\lambda_1-\tau_1)D(\lambda_2-\tau_2)R_E(\lambda_1-\lambda_2)[\sin(\theta_1-\theta_2)]$$

$$D(\tau)=R_p(\tau+d)-R_p(\tau-d),\ d=\tfrac{1}{2}P \text{ chip spacing}$$

These pre-detection filter outputs are used to compute one component of the loop steering command for the $L_2$ P code generator known as the tracking discriminant. This signal is formed by the dot product of the I and Q prompt and E minus L signals from the predetection filter outputs. This dot product is normalized by the prompt signal power to maintain a constant loop bandwidth independent of the received carrier to noise density ratio. The discriminant is written as:

$$\varepsilon_{code} = \frac{IP\,ID + QP\,QD}{S_P} = \frac{4P_{L1}P_{L2}R_P^2(\lambda_1-\tau_1)R_E^2(\lambda_1-\lambda_2)D(\lambda_2-\tau_2)R_P^2(\lambda_2-\tau_2)}{IP^2+QP^2}$$

Where $\lambda_1, \lambda_2$ are the true ionospheric code delays, $\tau_1, \tau_2$ are the receiver P code delays, and the $L_1, L_2$ signal amplitudes are $\sqrt{2P_1}$ and $\sqrt{2P_2}$, $R_p$, $R_E$ are the P and E code autocorrelation functions, respectively.

The discriminant drives the $L_2$ P code generator with new commands every 1 second from the pre-detection filter. A first order loop is sufficient to track the $L_1L_2$ signal because the DLL is aided from the $L_1$ carrier tracking loop. The $L_1$ carrier tracking loop drives the $L_1$ phase rotator to down convert the IF to baseband and remove Doppler due to satellite motion. The phase rotator for down conversion to baseband in the $L_2$ channel is scaled by the ratio of the carrier frequencies (−120/154) to derive the Doppler correction for the $L_2$ channel. The $L_2$ Doppler correction is scaled by a factor of 1/120 to derive the code rate aiding correction for the $L_2$ code VCO. The carrier-to-code updates are computed every 20 milliseconds.

The SNR at the output of the prompt pre-detection filter is a useful performance metric for comparison with the codeless technique. In dB, the pre-detection SNR is:

$$(S/N)_{dB} = 2\left\{\left(\frac{C^{C/A\,code}}{n_0}\right)_{dB-Hz}^{antenna} + 10\log T - 2F_{dB} + L_{l\,dB} - 66 - \right.$$
$$20\log R_w(\lambda_1 - \lambda_2) - 20\log R(\lambda_1 - \tau_1) - 20\log R(\lambda_2 - \tau_2)\right\}$$

This comparison highlights the significant performance advantage of the semi-codeless technique in reducing the pre-detection integration period. For example, a 10 dB SNR requires an pre-detection integration period of approximately 1 sec for a $C/n_o$ of 40 dB-Hz, while the codeless technique requires an integration time of approximately 25 seconds.

The relationships between the code and carrier signals for both $L_1$ and $L_2$ signals are described by the equations below. Code signal:

$$\rho_{L1} = r + i_{L1} + \tau + \mu_{\rho L1} + \eta_{\rho L1}$$

$$\rho_{L2} = r + i_{L2} + \tau + \mu_{\rho L2} + \eta_{\rho L2}$$

Carrier signal:

$$\phi_{L1} = r + i_{L1} + \tau + \mu_{\phi L1} + \eta_{\phi L1} + N_1$$

$$\phi_{L2} = r + i_{L2} + \tau + \mu_{\phi L2} + \eta_{\phi L2} + N_2$$

where $\phi_{L1,L2}$ is the carrier phase measurement, $\mu_\rho$ and $\mu_\phi$ are the code and carrier multipath errors, respectively, $\eta_\rho$ and $\eta_\phi$ are the code and carrier measurement noise, respectively, $\rho_{L1,L2}$ is the pseudorange, r is the true range plus clock errors, τ is the tropospheric refraction, and $N_{1,2}$ is the range cycle ambiguity for the $L_1$ and $L_2$ carriers.

The semi-codeless cross correlation algorithm can provide an $L_1$–$L_2$ carrier phase measurement equal to:

$$\phi_{L1} - \phi_{L2} = -i_{L1} + i_{L2} + \mu'_\phi + \eta'_{\phi 1} + N'$$

This provides another observable that has potential applications for "wide-lane" kinematic GPS. The L1–L2 carrier phase can be combined with the L1 carrier phase to reconstruct the L2 carrier phase.

The difference between the dual frequency P code measurements is obtained and is described as:

$$\rho_{L1} - \rho_{L21} = (i_{L1} - i_{L2}) + \mu'_\rho + \eta'_\rho$$

A post-detection filter is required to suppress the multipath and noise error terms to provide a low-noise estimate of the ionospheric delay to the satellite. In one embodiment of the invention, a first-order filter with an eight second time constant was used to realize the post detection processing.

Such a filter is suitable for very low rate ionospheric changes during periods of low solar activity. During periods of high solar activity, such a filter may not be adequate for processing the higher rates of ionospheric changes, in which case a higher order filter may be utilized.

The semi-codeless technique for high accuracy ionospheric GPS measurements of the present invention is expected to provide rms measurement errors of 0.25 meters or less. The disclosed algorithm has significant performance advantages over codeless techniques and has potential applications for wide lane kinematic techniques.

It is believed that the method and apparatus for eliminating ionospheric delay error in global positioning system signals of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

We claim:

1. A method for eliminating ionospheric delay error due to an ionospheric delay from the signals of a global positioning system signal including the L1 and L2 signals without knowledge of the Y code signal due to encryption of the L1 and L2 signals to determine a high precision position solution, the method comprising:

receiving the L1 and L2 signals, said L1 and L2 signals being modulated by a predetermined high precision code;

filtering the high precision code from said L1 and L2 signals;

cross-correlating said L1 and L2 signals;

determining the ionospheric delay by varying the relative delay between said L1 and L2 signals until a predetermined correlation value is reached wherein the relative delay is proportional to the ionospheric delay; and eliminating the ionospheric delay error from the position solution by correcting the position solution according to the determined ionospheric delay during measurement analysis of the position solution.

2. The method according to claim 1 wherein said filtering step includes filtering said L1 and L2 signals with a precorrelation filter having a bandwidth based upon the bandwidth of the encryption code of the L2 signal.

3. The method according to claim 1 wherein said filtering step includes filtering said L1 and L2 signals with a precorrelation filter having a bandwidth equal to the bandwidth of the encryption code of the L2 signal.

4. The method according to claim 1 wherein said filtering step includes filtering with an integrate and dump filter.

5. The method according to claim 1 wherein said predetermined correlation value is equal to a relative maximum correlation value.

6. The method according to claim 1 further comprising the step of generating an L2 carrier phase measurement from an L1 carrier phase measurement and a semi-codeless cross correlator L1–L2 carrier phase measurement.

7. The method according to claim 1, further comprising the step of generating a wide-lane L1–L2 carrier phase measurement for reconstructing the L2 carrier phase.

8. A processor for eliminating ionospheric delay error due to an ionospheric delay from the signals of a global positioning system signal including the L1 and L2 signals without knowledge of the Y code signal due to encryption of the L1 and L2 signals to determine a high precision position solution, the processor comprising:

a first precorrelation filter for filtering the encryption code from a signal comprising the L1 signal multiplied with a high precision code, said L1 signal being previously encoded with said high precision code, said first precorrelation filter providing an output;

a second precorrelation filter and a high precision code delay unit having a high precision code delayed output; said second precorrelation filter for filtering the encryption code from a signal comprising the L2 signal multiplied with said high precision code delayed output, said second precorrelation filter providing an output;

a predetection filter for filtering a signal comprising said output of said first precorrelation filter multiplied with said output of said second precorrelation filter, said predetection filter providing an output;

a tracking commands unit receiving said output of said predetection filter for processing tracking commands, said tracking commands unit providing an output to said high precision code delay unit; and a post detection filter receiving said output of said predetection filter for providing an output proportional to the ionospheric delay based upon the cross correlation of the L1 and L2 signals.

9. A processor as claimed in claim 7 further comprising a post detection processor for providing a semi-codeless cross correlator L2–L1 carrier phase measurement whereby a wide-lane signal is constructed for resolving L1 and L2 carrier phase ambiguity and for reconstructing L2 carrier phase.

* * * * *